(12) United States Patent
Anthony et al.

(10) Patent No.: US 7,879,139 B2
(45) Date of Patent: *Feb. 1, 2011

(54) REACTIVATION OF LIME-BASED SORBENTS BY $CO_2$ SHOCKING

(75) Inventors: Edward J. Anthony, Ottawa (CA); Dennis Lu, Ottawa (CA); Carlos Salvador, Ottawa (CA)

(73) Assignee: Her Majesty the Queen in right of Canada as represented by the Minister of Natural Resources, Ottawa, Ontario (CA)

( * ) Notice: Subject to any disclaimer, the term of this patent is extended or adjusted under 35 U.S.C. 154(b) by 403 days.

This patent is subject to a terminal disclaimer.

(21) Appl. No.: 10/577,542
(22) PCT Filed: Nov. 14, 2003
(86) PCT No.: PCT/CA03/01759
§ 371 (c)(1), (2), (4) Date: Apr. 28, 2006
(87) PCT Pub. No.: WO2005/046862
PCT Pub. Date: May 26, 2005

(65) Prior Publication Data
US 2007/0032380 A1 Feb. 8, 2007

(51) Int. Cl.
B01D 53/02 (2006.01)
B01D 53/12 (2006.01)
B01J 20/00 (2006.01)
B01J 20/04 (2006.01)

(52) U.S. Cl. .............................. 95/139; 95/108; 95/148; 502/400

(58) Field of Classification Search ................. 502/400, 502/20, 34; 95/108, 139, 148, 137
See application file for complete search history.

(56) References Cited

U.S. PATENT DOCUMENTS
4,226,839 A 10/1980 O'Neill
(Continued)

FOREIGN PATENT DOCUMENTS
GB 2291051 A 1/1996
WO WO 03/080223 A 10/2003

OTHER PUBLICATIONS

Shimizu T, Hirama T, Hosoda H, Kitano K, Inagaki M, Tejima K, "A twin fluid-bed reactor for removal of CO2 from combustion processes" Chemical Engineering Research & Design, vol. 77, No. 1 (1999), pp. 62-68.*

(Continued)

Primary Examiner—Timothy C Vanoy
Assistant Examiner—Diana J Liao
(74) Attorney, Agent, or Firm—Chalker Flores, LLP; Chainey P. Singleton

(57) ABSTRACT

The present invention discloses a method and an apparatus for reactivating lime-based sorbents and increasing the carbon dioxide-capture capacity of the sorbent in the combustion of carbon-containing fuels. The method of the present invention seeks to increase the carbon dioxide capture capacity of lime-based sorbents by applying concentrated or 100% carbon dioxide directly to a lime-based sorbent. Optionally, the lime-based sorbent may be pretreated using a hydration process after each process of carbon dioxide separation. The regenerated sorbent is carbonated in a presence of concentrated carbon dioxide and elevated temperatures. The invention is useful in reducing the need to add additional sorbent to maintain the carbonation/calcination cycle. The regenerative potential of the sorbent as manifested by the present invention leads to increased carbon dioxide-capture capacity of the sorbent.

18 Claims, 4 Drawing Sheets

U.S. PATENT DOCUMENTS

| | | | |
|---|---|---|---|
| 4,312,280 | A | 1/1982 | Shearer et al. |
| 4,900,533 | A | 2/1990 | Malden |
| 5,792,440 | A | 8/1998 | Huege |
| 6,309,996 | B1 * | 10/2001 | Fan et al. .................. 502/24 |
| 2002/0037246 | A1 | 3/2002 | Beal |
| 2003/0007918 | A1 | 1/2003 | Fan et al. |
| 2005/0060985 | A1 | 3/2005 | Garcia et al. |

PUBLICATIONS

E. J. Anthony, L. Jia, J. Woods, W. Roque, S. Burwell, "Pacification of high calcic residues using carbon dioxide" Waste Management 20 (2000) pp. 1-13.*

EPO Office Action for Application No. 03 818 984.1 dated Dec. 27, 2007.

Gupta, H., et al., "Carboniation-Calcification Cycle Using High Reactivity calcium Oxide for Carbon Dioxide Separation from Flue Gass," Ind Eng Chem Res (2002), 41:4035-4042.

Salvadore, C., et al., "Enhancement of CaO for CO2 capture in an FBC environment," Chem Eng J (2003), 93:187-195.

Kuramoto, et al., "Repetitive Carbonation-Calcination Reactions of Ca-Based Sorbents for Efficient CO2 Sorption at Elevated Temperatures and Pressures," Ind. Eng. Chem. Res. 42:975-981 (2003).

* cited by examiner

REACTIVATION OF LIME-BASED SORBENTS BY $CO_2$ SHOCKING

FIELD OF THE INVENTION

This invention relates to the reactivation of carbon dioxide and sulphur oxides sorbents used in the fluidized bed combustion of carbon and sulphur-containing fuels. More particularly, the present invention relates to increasing the gas-capture capacity of these sorbents and thereby reduce the level of emission of carbon dioxide and sulphur oxides into the atmosphere.

BACKGROUND OF THE INVENTION

The increase in carbon emissions and the rising concentration of carbon dioxide and sulphur oxides in our atmosphere has forced the consideration of the control of the emission of these gasses from stationary sources such as fossil fuel combustors. A widely accepted "zero emission" policy for carbon dioxide and the need for greenhouse gas control technologies has emphasized the need to separate carbon dioxide from combustion gases and thereby obtain a purified stream of carbon dioxide.

While separation of carbon dioxide from flue gases is a viable option, the inherent cost is high. Accordingly, a range of approaches to separating carbon dioxide by more cost-effective processes is emerging. Numerous carbon dioxide separation processes are currently being tested for their deployment in fossil-fuel-based power plants.

The known absorption processes employ physical and chemical solvents such as selexol and rectisol while adsorption systems capture carbon dioxide on a bed of adsorbent materials such as molecular sieves or activated carbon. Carbon dioxide can also be separated from other gases by condensing it out at cryogenic temperatures. Polymers, metals such as palladium and molecular sieves are also being evaluated for membrane-based separation processes. A carbon dioxide chemical looping technique has been proposed which utilizes the carbonation of lime and the reversible calcination of limestone as a means of capturing and separating carbon dioxide. Fluidized bed combustion (FBC) of carbonaceous fuels is an attractive technology in which the removal of sulphur dioxide can be achieved by injecting a calcium-based sorbent into the combustor. Lime-based materials are the most commonly employed sorbents. However the sorbent utilization in the FBC system is rather low, typically less than 45%. The low utilization of the sorbent results in significant amounts of unreacted calcium oxide in the furnace ashes. This poses an expensive as well as a potential safety risk in deactivating the remaining calcium oxide before the ashes can be safely disposed of, for example in a landfill site.

Ash produced in an FBC furnace usually contains 20-30% unreacted calcium oxide. Reactivation of the sorbent by hydration with either water or steam can improve the sorbent utilization. During hydration of the partially-sulphated sorbent, water or steam permeates the outer calcium sulphate layer and reacts with the calcium oxide in the core of the sorbent particles to form calcium hydroxide. When the reactivated sorbent particles are re-injected into the FBC furnace, the thus formed calcium hydroxide decomposes to calcium oxide becomes available for further sulphation.

Recent investigations have indicated that fly ash has a quite different behaviour compared to bottom ash. Fly ash was not shown to be reactivated by means of any hydration treatment. Also, drastic steam hydration treatment actually reduced the sulphur dioxide carrying capacity of fly ash. These results suggested that while hydration is an effective measurement for reactivating bottom ash, its efficiency for reactivating fly ash is questionable.

Limestone is typically used as a sorbent for sulphur dioxide and/or carbon dioxide capture. However, with multiple calcination/carbonation cycles to reactivate the sorbent, due to loss of pore volume in the lime-based sorbent, the absorption efficiency of the sorbent particles rapidly decreases.

In principle, the pore volume created during calcinations should be sufficient to allow more or less complete recarbonation of the calcium oxide. In practice, however, recarbonation occurs preferentially near the particle exterior, such that the surface porosity approaches zero after multiple cycles, preventing carbon dioxide from reaching unreacted calcium oxide in the interior of the particle. To reach calcium oxide in the interior of the sorbent particles, the carbon dioxide must diffuse through the carbonated layer, the result is that the reaction between the carbon dioxide and the sorbent particles gradually slows down. Sintering in each calcination cycle is probably another factor for lowering the reactivation of calcium oxide after multiple carbonation and calcination cycles. Prior art processes have attempted to find a solutions to the problems associated with the regeneration of lime-based sorbent in multiple carbonation/calcination cycles.

Huege, in U.S. Pat. No. 5,792,440, discloses the treatment of flue gases exhausted from a lime kiln to produce a high purity calcium carbonate precipitate. A source of calcium oxide is hydrated to form calcium hydroxide which is contacted with carbon dioxide to form a high purity calcium carbonate precipitate.

Rechmeier, in U.S. Pat. No. 4,185,080, discloses the combustion of sulfur-containing fuels in the presence of calcium carbonate or calcium magnesium carbonate to form calcium sulfate or calcium magnesium sulfate. The calcium oxide or calcium magnesium oxide is removed from the combustion ashes, and is slaked with water to form the corresponding hydroxides, which are recycled to the combustion zone.

Shearer, in U.S. Pat. No. 4,312,280, discloses increasing the sulphation capacity of particulate alkaline earth metal carbonates to scrub sulfur dioxide from flue gasses produced during the fluidized bed combustion of coal. The recovered partially sulfated alkaline earth carbonates are hydrated in a fluidized bed to crack the sulfate coating to facilitate the conversion of the alkaline earth oxide to the hydroxide. Subsequent dehydration of the sulfate-hydroxide to a sulfate-oxide particle produces particles having larger pore size, increased porosity, decreased grain size and additional sulfation capacity.

Malden, in U.S. Pat. No. 4,900,533, discloses the production of alkaline earth metal oxide by calcining raw alkaline earth metal carbonate. The oxide is slaked in water to form a suspension of the corresponding alkaline earth metal hydroxide, cooling the suspension and carbonating the hydroxide in suspension in water with substantially pure carbon dioxide in the presence of a dithionite bleaching reagent to form a precipitate of an alkaline earth metal carbonate. The precipitate is separated from the aqueous medium by filtration.

Kuivalaine, in U.S. Pat. No. 6,290,921, discloses a method and apparatus for binding pollutants in flue gas comprising introducing at least one of calcium oxide, limestone and dolomite into a combusting furnace for binding pollutants in the flue gas in the furnace. Water is mixed in an amount up to 50% of the weight of the recovered ash to hydrate at least a portion of the calcium oxide in the ash to form calcium hydroxide. Rheims, in U.S. Pat. No. 6,537,425, discloses adding to a pulp suspension of a medium containing calcium oxide or calcium hydroxide during the chemical process of loading with calcium carbonate fibers contained in the pulp suspension, wherein the treated pulp suspension is charged with pure carbon dioxide, which, during the progression of the reaction, converts at least a significant portion of the calcium oxide into calcium carbonate.

Although the processes using the lime-based sorbents to trap both carbon dioxide and sulphur dioxide are moderately successful, they have several disadvantages. First, due to the low efficiency of absorption of carbon dioxide and/or sulphur dioxide, the addition of fresh sorbent is required, resulting in increased operating cost. Second, the amount of sorbent is far higher than inherent chemistry requires, so that the recovered combustor ash commonly contains significant amounts of calcium oxide. Third, due to the calcium oxide content, the recovered ash wastes cannot simply be disposed of in a landfill site without further processing to destroy the calcium oxide.

While it is known that sulphur dioxide capture by limestone may be improved significantly by treatment of the limestone with sodium chloride, it is also known that the addition of salt can impact negatively on the system, leading to system corrosion and the production of toxic by products. Moreover, the cost of the salt pretreatment adversely affects the low price of raw limestone.

In view of the foregoing, there is a demand for a means of regenerating lime-based sorbents by multiple calcination/carbonation processes. In addition, there is a demand for a method of pretreating the lime-based sorbent so as to increase its capture capacity for carbon dioxide and sulphur dioxide.

SUMMARY OF THE INVENTION

The present invention seeks to provide a method of, and an apparatus for, reactivating or regenerating sorbents used in fuel combustion processes for the separation and capture of carbon dioxide or sulphur dioxide. The present invention in particular seeks to provide a method of reactivating or regenerating lime-based sorbents and of improving the carbon dioxide or sulphur dioxide sorbent capacity of lime-based sorbents.

The method of the present invention seeks to increase the carbon dioxide capture capacity of lime-based sorbents by applying concentrated or 100% carbon dioxide directly to a lime-based sorbent which will make it capable of absorbing additional carbon dioxide or sulphur dioxide after multiple calcination/carbonation cycles.

Additionally, this invention seeks to improve the absorption capacity of calcium oxide and to maintain the carbon dioxide absorption capacity at the same level hydrating the sorbent after each calcination process.

In accordance with one aspect of the invention, the present invention seeks to provide a method of increasing the carbon dioxide-capture capacity of an alkaline earth metal sorbent in the fluidized bed oxidation of combustion fuels comprising:

(a) introducing a suitable calcinable material into a fluidized bed;

(b) calcining the calcinable material to form an alkaline earth metal oxide and carbon dioxide;

(c) carbonating the alkaline earth metal oxide in a carbonator in the presence of concentrated carbon dioxide at elevated temperature such that the alkaline earth metal oxide captures the carbon dioxide to produce an alkaline earth metal carbonate;

(d) re-introducing the carbonated alkaline earth metal carbonate into the fluidized bed; and (e) calcining the carbonated alkaline earth metal carbonate to regenerate the alkaline earth metal oxide; and (f) repeating steps (a) to (e) utilizing the product of step (e).

In accordance with a second aspect of the invention, the present invention seeks to provide a method for increasing the carbonation capacity of an alkaline earth metal sorbent for reaction with carbon dioxide wherein alkaline earth metal oxide is produced during the calcination of an alkaline earth metal carbonate in the fluidized bed oxidation of combustion fuels, comprising hydrating particles of alkaline earth metal oxide to form particles of alkaline earth metal hydroxide at a suitable temperature and pressure; and carbonating the particles of alkaline earth metal hydroxide to form particles of alkaline earth metal carbonate.

In a third aspect, the present invention seeks to provide a method of increasing the carbonation capacity of an alkaline earth metal sorbent for reaction with carbon dioxide wherein alkaline earth metal oxide is produced during the calcination of alkaline earth carbonate in the fluidized bed oxidation of combustion fuels, for reaction with carbon dioxide comprising:

(a) introducing a suitable calcinable material into a fluidized bed;

(b) calcining the calcinable material to form an alkaline earth metal oxide and carbon dioxide;

(c) pretreating particles of the alkaline earth metal oxide in a hydration reactor at a suitable temperature and pressure to form particles of alkaline earth metal hydroxide;

(d) carbonating the alkaline earth metal hydroxide to produce alkaline earth metal carbonate and water;

(e) calcining the alkaline earth metal carbonate to regenerate the alkaline earth metal oxide and produce carbon dioxide;

(f) carbonating the alkaline earth metal oxide in a carbonator at elevated temperature such that the alkaline earth metal oxide captures the carbon dioxide to produce an alkaline earth metal carbonate;

(g) re-introducing the carbonated alkaline earth metal carbonate into the fluidized bed; and (h) calcining the carbonated alkaline earth metal carbonate to regenerate the alkaline earth metal oxide;

(i) and repeating steps (c) to (g) utilizing the product of step (h).

In a fourth aspect the present invention seeks to provide a method of increasing the carbon dioxide-capture capacity of an alkaline earth metal sorbent in the fluidized bed oxidation of combustion fuels comprising:

(a) introducing a suitable calcinable material into a fluidized bed (b) calcining the calcinable material in a first calciner to form an alkaline earth metal oxide and carbon dioxide;

(c) pretreating the alkaline earth metal oxide in a hydration reactor at a suitable temperature and pressure to form an alkaline earth metal hydroxide;

(d) carbonating the alkaline earth metal hydroxide to produce an alkaline earth metal carbonate and water;

(e) calcining the alkaline earth metal carbonate in a second calciner to regenerate the alkaline earth metal oxide and produce carbon dioxide;

(f) carbonating the alkaline earth metal oxide in a carbonator in the presence of concentrated carbon dioxide at elevated temperature such that the alkaline earth metal oxide captures the carbon dioxide to produce an alkaline earth metal carbonate;

(g) re-introducing the carbonated alkaline earth metal carbonate into the fluid bed; and (h) calcining the carbonated alkaline earth metal carbonate to regenerate the alkaline earth metal oxide; and (i) repeating steps (c) to (h) utilizing the product of step (h).

In the carbonation reaction, the reaction product of calcium oxide and carbon dioxide is calcium carbonate (Equation 1 below). Because the crystalline molar volume of the carbonate is higher than that of the oxide, the calcium carbonate leads to the plugging of the pores of the sorbent which eventually renders the interior surface of the sorbent ineffective. To overcome this, the prior art teaches to add fresh sorbent.

Shocking with pure carbon dioxide as contemplated by the present invention obviates the necessity of adding fresh sorbent as it has the effect of regenerating the calcium oxide sorbent. Furthermore, pre-treating the lime-based sorbent using a hydration process further improves the sorption capacity of calcium oxide by promoting the carbonation reaction. Typically, calcium oxide is hydrated to calcium hydroxide which is then carbonated to calcium carbonate and water.

Thus, the present invention may be summarized by the following reactions:

Carbonation Reaction: $CaO + CO_2 \rightarrow CaCO_3$ (1)

Calcination Reaction: $CaCO_3 \rightarrow CaO + CO_2$ (2)

Hydration Process: (a) $CaO + H_2O \rightarrow Ca(OH)_2$ (3)

(b) $Ca(OH)_2 + CO_2 \rightarrow CaCO_3 + H_2O$.

DETAILED DESCRIPTION OF THE INVENTION

Figure 1:
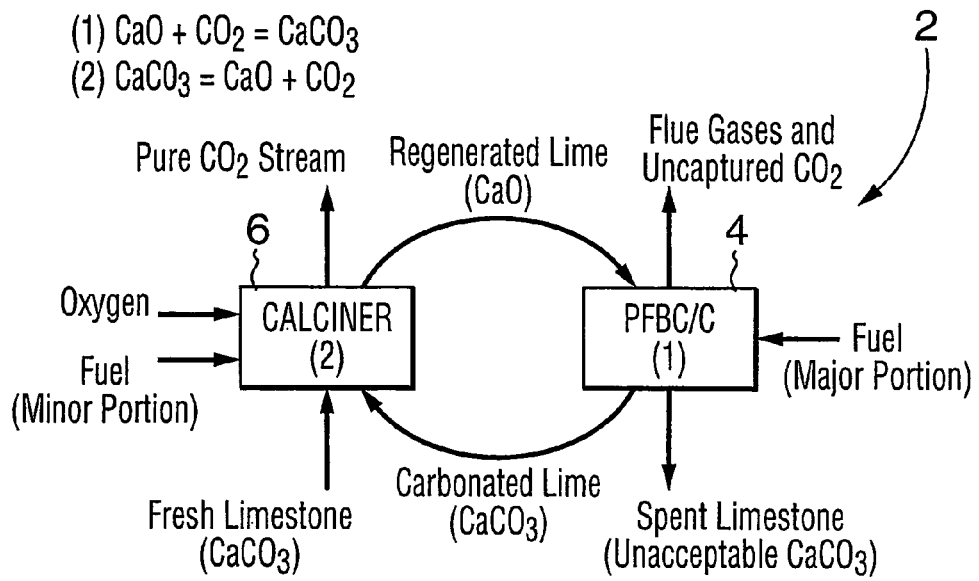
FIG. 1 is a schematic representation of the use of a lime-based sorbent to remove carbon dioxide in a fluidized bed combustion environment.

A carbon dioxide hot gas scrubbing process according to this invention which produces a pure carbon dioxide stream is schematised in FIG. 1 and is denoted as 2. This scheme involves the use of a pressurized fluidized bed combustor/carbonator (PFBC/C) 4, where the fuel is burned in the presence of a sorbent which can, depending on operating conditions, remove up to 80% or more of the carbon dioxide and effectively all of the sulphur dioxide, and a calciner 6 where sorbent is regenerated by burning minor proportions of the fuel in oxygen. The pure carbon dioxide emitted is either used for some purpose or sequestered.

Such a process requires the sorbent to be recycled many times and deactivation of the sorbent will be a major problem. The large quantities of lime necessary for such a scheme mean that reactivation of the sorbent for carbon dioxide capture will be much more economically attractive than in the case of reactivation of lime for sulphur dioxide capture when compared with other schemes for carbon dioxide sequesteration.

Figure 2:
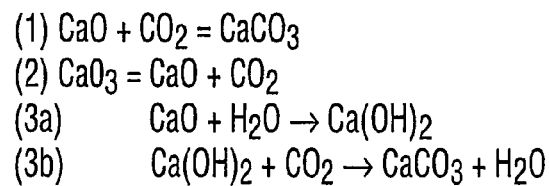
FIG. 2 is a schematic illustration of sorbent reactivation in a fluidized bed under the conditions of concentrated carbon dioxide and hydration.
Figure 2:
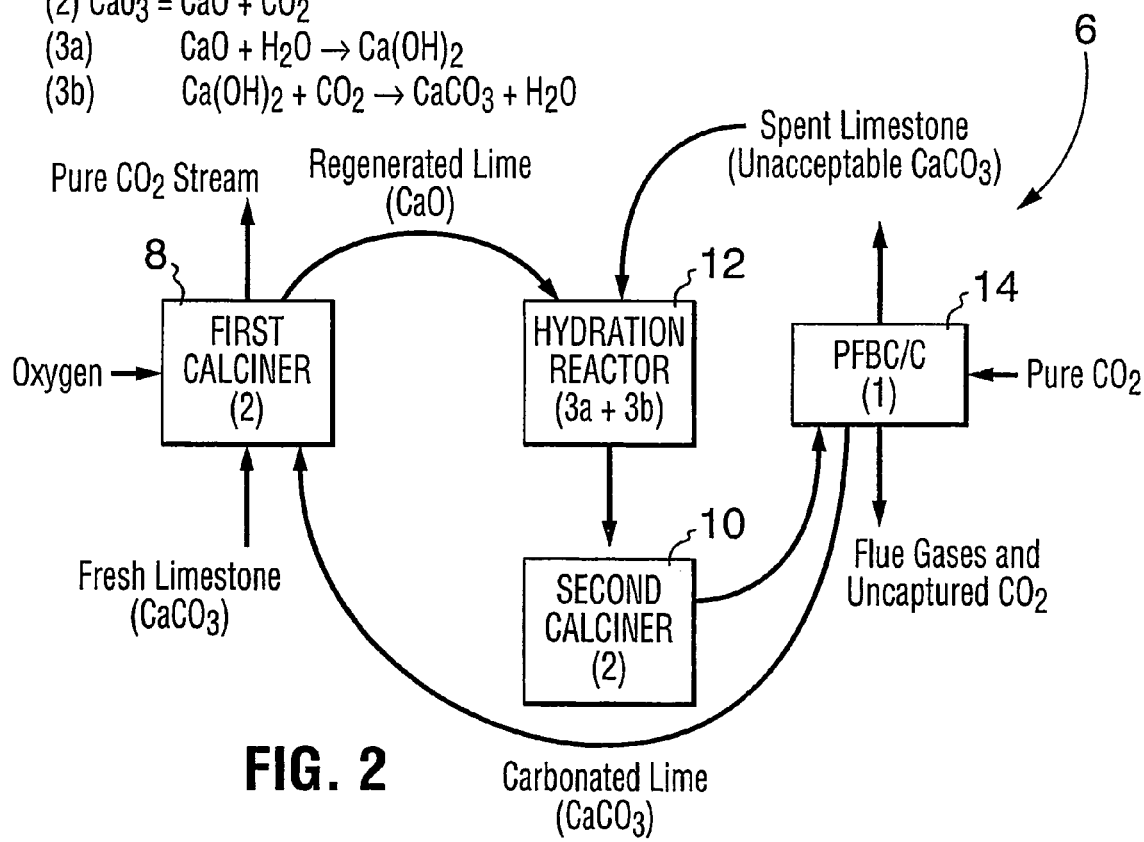

The concept of the present invention is schematised in FIG. 2 and is denoted as 6. This scheme involves the use of a pressurized fluidized bed combustor/carbonator (PFBC/C) 14. A circulating fluidized bed combustor (CFBC/C) may also be used. In this scheme, fresh sorbent such as limestone is fed into a first calciner 8 and calcium oxide is produced according to equation. The calcium oxide is hydrated in a hydration reactor 12 to produce calcium hydroxide which is carbonated to calcium carbonate (equations 3(a) and (b) on page 8). The calcium carbonate is fed to a second calciner 10 where calcium oxide (CaO) is regenerated. The regenerated calcium oxide is fed to the CFBC/C (or PFBC/C) where it is carbonated in the presence of concentrated carbon dioxide (equation 1). The calcium oxide in this reaction captures the carbon dioxide to produce carbonated calcium carbonate which is fed to the first calciner to continue the cycle. After several cycles, spent limestone from the PFBC/C is channeled to the hydration reactor 12 after which the calcination/carbonation loop comprising calcination in the second calciner 10 and carbonation in the CFBC/C 14 is repeated.

Accordingly, the need to add fresh sorbent is reduced as the sorbent is continuously regenerated through the hydration process and subsequent calcination/carbonation cycle. Additionally, carbonating in the presence of concentrated carbon dioxide in the CFBC/C 14 increases the capacity of the sorbent to capture carbon dioxide. The only fresh sorbent needed will be the amount required to balance sorbent lost in the ashes withdrawn from the combustor. Sorbent is also lost through the side reaction involving the capture of sulfur dioxide by calcium oxide.

The following example is included for the purpose of illustration only and is not intended to limit the scope of the invention.

Experimental Work

Experiments were performed to verify the effect of calcination/carbonation cycling on the carrying capacity of calcium oxide for carbon dioxide. Experiments were carried out on three Canadian limestone types (Havelock, Cadomin and Kelly Rock) to determine their ability to remove carbon dioxide in multiple carbonation/calcination cycles. Two systems were used: a circulating fluidized bed combustor (CFBC) operated in the bubbling FBC mode and a thermogravimetric analyser (TGA).

TGA—Apparatus and Methodology

Figure 3:
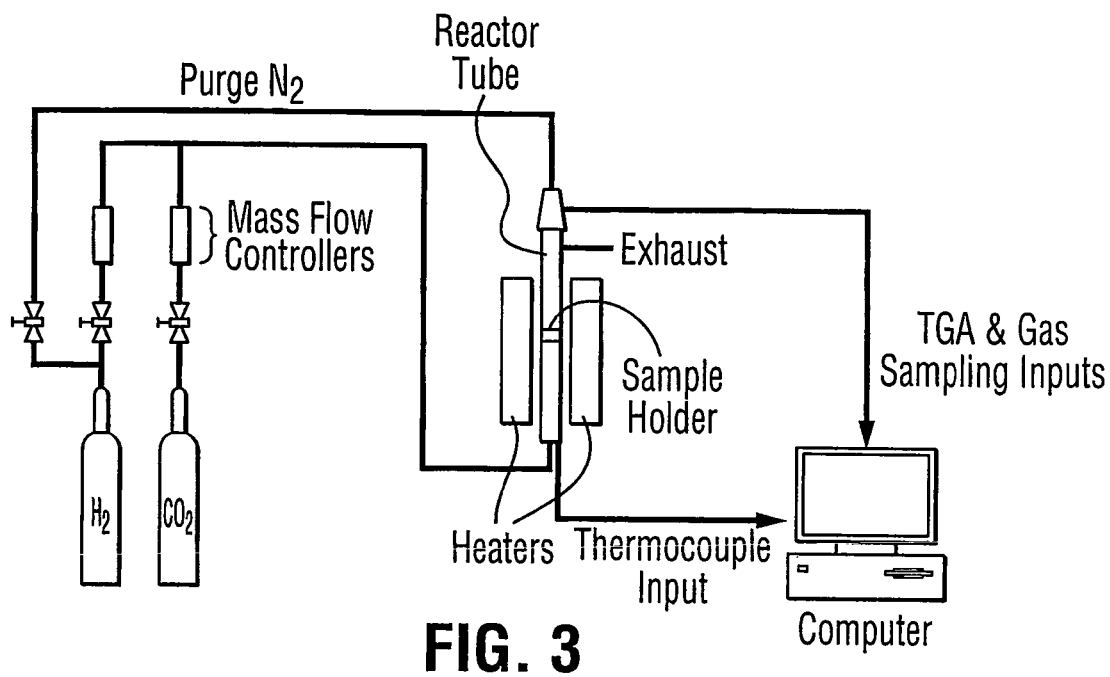
FIG. 3 is a simplified schematic diagram of the thermogravimetric analyzer (TGA).

A simplified schematic of the TGA is shown in FIG. 3. The TGA consists of an electronic balance (Cahm 1100), a vertical electric furnace, a reactor tube, a carrier gas system and a computerized data acquisition system. The reactor tube is made of Inconel™ 600 alloy and has an inside diameter of 24 mm and a height of 900 mm. The reactor tube can be unscrewed from the TGA revealing a platinum sample holder (10 mm in diameter, 1.5 mm in depth). An electric furnace surrounds the reactor tube and is the primary heat source. The carrier gas flow system consists of a digital mass flow controller (Matheson Gas Products). Losses or gains in mass are measured by the balance and recorded by the data acquisition system. Changes in gas composition are also measured and recorded.

Limestone types tested included Havelock, Cadomin, and Kelly Rock. A summary of the experimental parameters is given in Table 1. Samples of 15-30 mg were placed in the reactor where they were calcined at 850° C. and at atmospheric pressure in nitrogen, and then carbonated at 700° C.

and 1 atm in 15% $CO_2$/85% $N_2$ gas mixture. A thermocouple was used to measure temperature just below the sample holder. The temperature and sample mass were recorded in 5-second intervals until termination of the run.

TABLE 1

TGA Experimental Parameters

| Limestone Type | 1. Cadomin | 2. Havelock |
|---|---|---|
| Sample Mass | 22-23 mg | 22-23 mg |
| Calcination Temperature | 850° C. | 850° C. |
| Carbonation Temperature | 700° C. | 700° C. |
| $CO_2$ Concentration in $N_2$ | 15% | 15% |
| $CO_2$ Concentration (Reactivation Study) | 100% (cycles 7 and 10) | 100% (cycle 9) |
| $Na_2CO_3$ Concentration per Mole of $CaCO_3$ (Reactivation Study) | 0.5% (all cycles) | 0.5% (all cycles) |
| NaCl Concentration per Mole of $CaCO_3$ (Reactivation Study) | 0.5% (all cycles) | 0.5% (all cycles) |
| Particle Size ($D_p$) | 650 μm < $D_p$ < 1675 μm | 650 μm < $D_p$ < 1675 μm |

Figure 4:
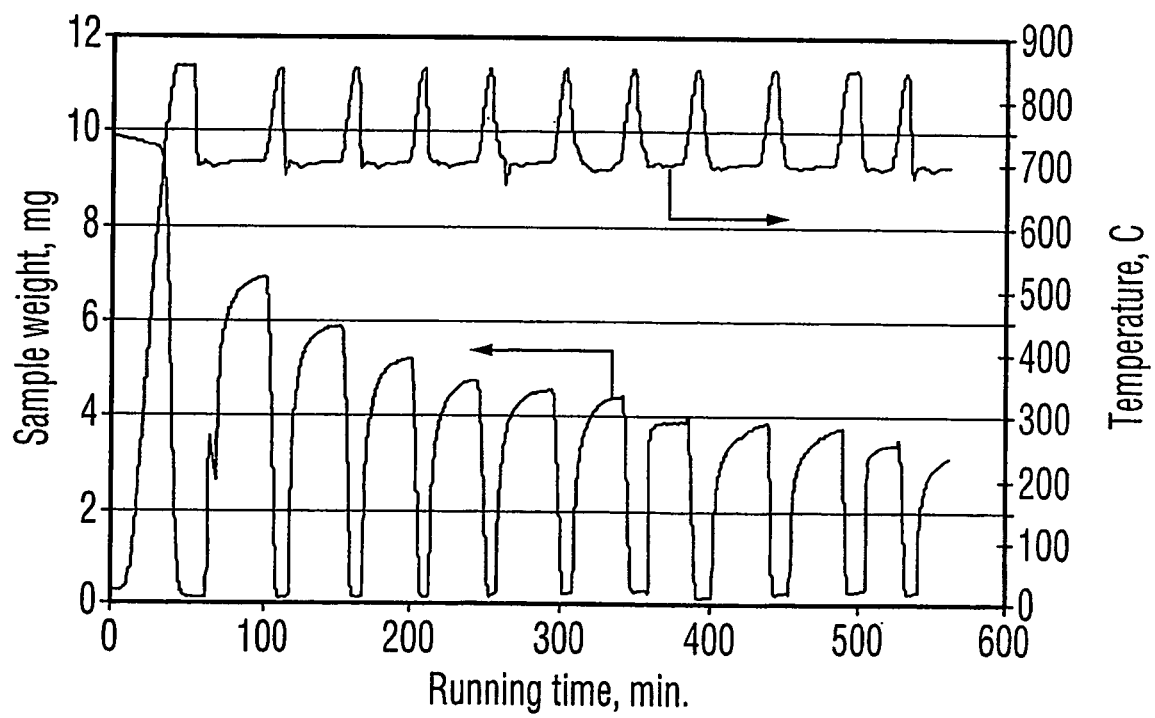
FIG. 4 is a record of the weight-temperature-time data collected by the TGA for Cadomin limestone.
Figure 5:
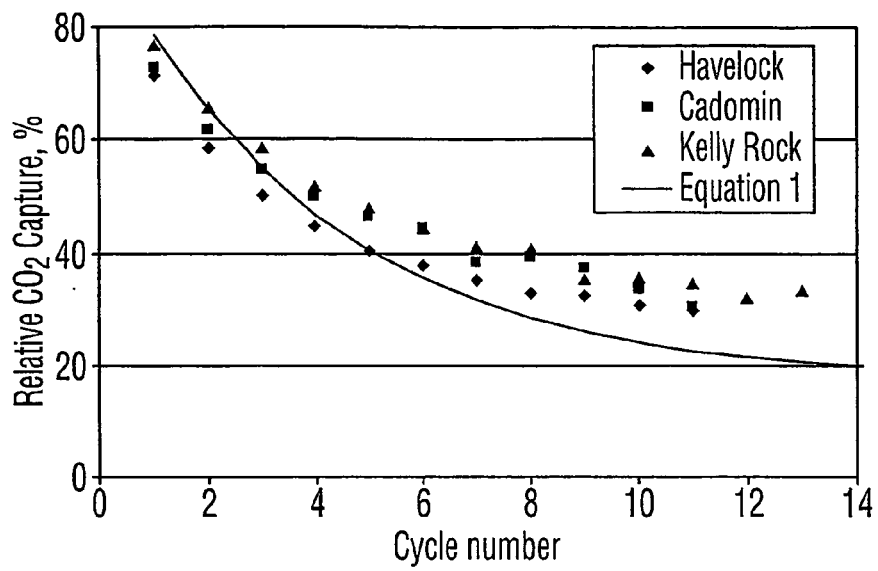
FIG. 5 is a comparison of carbon dioxide capacity of Cadomin, Havelock and Kelly Rock limestone over 13 cycles in the TGA.

FIG. 4 depicts a typical raw process record of the weight-temperature-time data collected by the TGA for Cadomin limestone, comprising 11 calcination/carbonation cycles. FIG. 5 illustrates a comparison of carbon dioxide capacity of Cadomin, Havelock and Kelly Rock limestone over 13 cycles in the TGA. The solid line in the figure represents an empirical model based on TGA and fixed bed data from other investigators as proposed by Abanades, J. C., in Chemical Engineering Journal, 90, 303-306 (2002) (See FIG. 3). It can be noted that the TGA results of this study match the empirical model curve during the first five cycles. However, the TGA results show higher capacity with increasing cycle number, leading to a significant difference after ten cycles. In general, all three-limestone types follow the same trend, starting with $CO_2$ capacity just under 80% and decaying to a final capacity between specific limestone types, particularly during the first few cycles; however, these differences are negligible. This behavior is in contrast to results obtained from the FBC, where Havelock limestone showed a consistently higher capacity for $CO_2$ than Cadomin limestone.

FBC—Apparatus and Methodology

The major components of the pilot-scale CFBC, used herein in the bubbling mode, consist of a dense bed region, riser section, cyclone and baghouse. The so-called dense bed region is 1 m high with an internal diameter of 0.1 m. This combustion chamber section is surrounded by 4 electric heaters (18 kW total), which can provide supplemental heat during operation. The heaters can maintain the dense bed region at temperatures of up to 900° C.

Immediately above the dense bed region, at the start of the riser, are two inlet ports—a solid feed and return-leg port. The solid feed port is used to initially charge the dense bed region with solids and to supply fuel to the CFBC during a combustion experiment. The riser is 5 m long and refractory lined; it is connected to the cyclone, which is in turn connected to the baghouse, exhaust stack and return-leg. Air is supplied to the CFBC at the base of the dense bed region through a windbox. Air passes through the windbox and up through a distributor plate which both supports solids in the dense bed region and maintains a uniform distribution of air over the internal cross-section of the CFBC. As the air travels up along the dense bed region it fluidizes the bed solids and will carry some solids up along the riser and into the cyclone. Once in the cyclone solids are separated and returned to the dense bed region via the return-leg, while the main gas flow and fine solids are either discharged to the atmosphere directly or passed through the baghouse before discharging to the atmosphere. The baghouse captures fine particles, removing them from the gas stream.

The CFBC is equipped with a data acquisition system which records the system temperature, pressure drop and gas composition. Temperatures in the dense bed region are measured at 4 different points by K-type thermocouples (0.12, 0.24, 0.36 and 0.48 m from the distributor plate). Thermocouples and pressure taps are also situated along the riser, cyclone and return-leg. Gas sampling is performed at the exit of the cyclone, where detectors record the level of $O_2$, $CO_2$, CO, $SO_2$ and $NO_x$. Solid samples can be collected at the base of the return leg or immediately above the distributor plate in the dense bed region.

A summary of the experimental conditions is listed in Table 2. FBC experiments used approximately 5 kg of limestone per experiment. Prior to the start of any experiment the limestone was sieved to ensure that particle size was between 650 and 1675 μm. The CFBC was operated as a bubbling fluidizes bed with a fluidizing velocity of 1 m/s rather than a circulating fluidized bed during these tests to maintain control over the number of cycles experienced by particles. In circulating fluidized bed mode, calcined particles will leave the dense bed region and enter the riser where they carbonate due to relatively lower temperatures and high carbon dioxide concentrations and then be recycled back t the dense bed and be recalcined.

TABLE 2

FBC Experimental Parameters

| LimestoneType | Cadomin | Havelock |
|---|---|---|
| Initial Bed Mass | 5 kg | 5 k |
| Fluidizing Velocit | 1 m/s | I m/s |
| CalcinationTemperature | 850° C. | 850° C. |

TABLE 2-continued

FBC Experimental Parameters

| LimestoneType | Cadomin | Havelock |
|---|---|---|
| Carbonation Temperature | 700° C. | 700° C. |
| $CO_2$ Concentration | 15% | 15% |
| $CO_2$ Concentration (Reactivation Study) | 100% (cycle 8) | 100% (cycles 12 and 13) |
| $Na_2CO_3$ Concentration per Mole of $CaCO_3$ (Reactivation Study) | NA | 4% (all cycles) |
| NaCl Concentration per Mole of $CaCO_3$ (Reactivation Study) | NA | 0.5% (all cycles) |
| Particle Size ($D_p$) | 650 μm < $D_p$ < 1675 μm | 650 μm < $D_p$ < 1675 μm |

Limestone was calcined at 850° C. in air. Once the limestone was fully calcined the temperature in the bed was lowered to 700° C. and the lime was exposed to a mixture of air and carbon dioxide (carbon dioxide concentration was verified by direct measurement at the inlet of the dense bed region). The typical carbon dioxide concentration was 15% for all tests except carbon dioxide reactivation tests where calcium oxide was exposed to 100% carbon dioxide (see description below). The end of carbonation marked the end of a cycle. The bed temperature was then increased back to 850° C. in preparation for a new calcination/carbonation cycle. Samples were collected periodically during calcinations and carbonation steps and tested to ensure complete calcination/carbonation was occurring.

Figure 6:
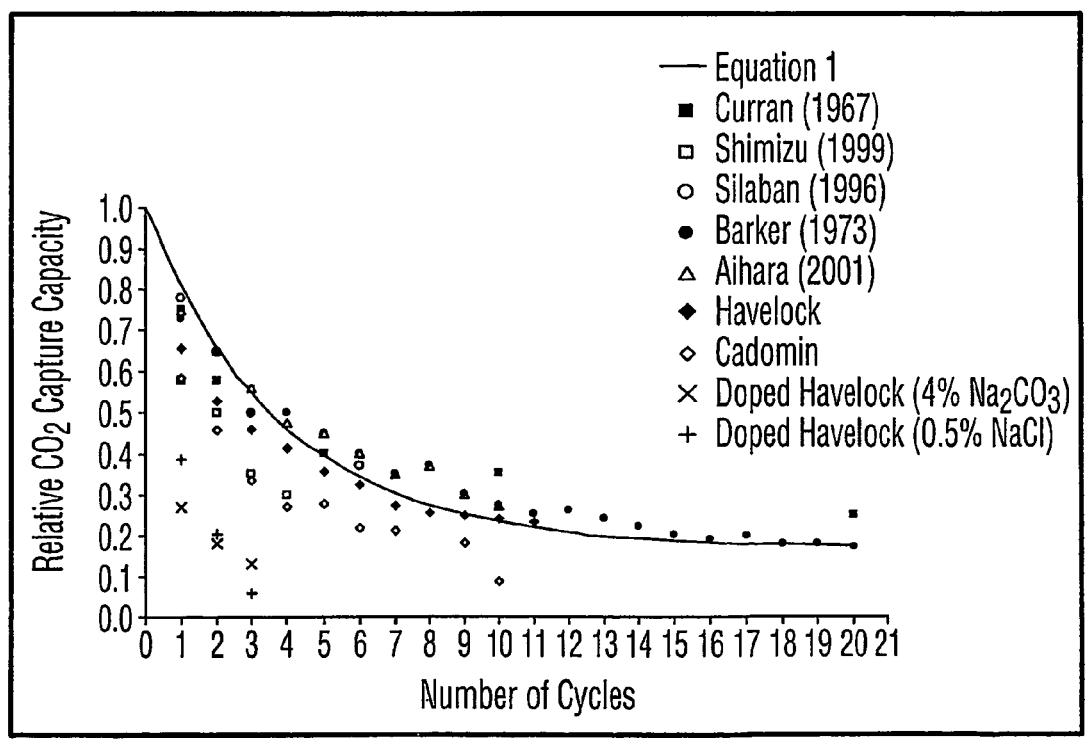
FIG. 6 is a comparison of the effects of calcination/carbonation cycling in the FBC environment for Havelock and Cadomin limestones.

The effects of calcination/carbonation cycling in the FBC for Havelock and Cadomin limestones are summarized in FIG. 6. (For the sake of comparison, data from other workers is also presented.) On that Figure the solid line represents the empirical model curve from the work of Abanades, J. C., in Chemical Engineering Journal, 90, 303-306 (2002). It should be noted, however, that since the empirical curve is based on data that derived primarily from TGA and fixed bed experiments, it can be argued that the results may not be directly applicable to PBC behavior. Nevertheless, there appears to be good agreement between the Havelock results and the empirical curve. This is in contrast to the Cadomin data, which shows a consistently lower capacity for $CO_2$. Furthermore, unlike the Havelock results, the Cadomin data do not appear to level off, suggesting that limestone type may be a factor in apparent contradiction to the work of Abanades, J. C., (2002) which argues that limestone type is not a factor in determining carbonation performance. However, more work is needed on different limestone types to determine how natural limestones perform in such cycles before such generalizations are made.

Carbon Dioxide Reactivation Tests

Carbon dioxide reactivation tests involved exposing the calcined limestone to pure carbon dioxide for one or two cycles at or near the end of a run, where an experimental run consists of between 8 and 14 cycles. Once carbonation was deemed complete, the limestone was calcined as described above. carbon dioxide reactivation experiments were performed on both Cadomin and Havelock limestones.

Two additional reactivation experiments were carried out on the Havelock limestone, exclusively. These experiments were involved doping the limestone with 4% sodium carbonate ($Na_2CO_3$) per mole of calcium carbonate ($CaCO_3$) and 0.5% sodium chloride (NaCl) per mole of calcium carbonate ($CaCO_3$), respectively. The limestone was soaked in a solution of the additive ($Na_2CO_3$ or NaCl) and water for a period of 24 hours. Water was slowly evaporated in an oven at 100° C. and atmospheric pressure. One three-cycle run was performed for each additive. The concentration of sodium carbonate and sodium chloride chosen is partially based on work by Razbin et al. in The Fluidized Bed Combustion of a High Sulphur Maritime Coal, ERL Division Report, 85-44, December 1984.

Morphological Study

For the FBC carbon dioxide reactivation experiments, cycles 11, 12 and 14 of the Havelock test, samples were collected for detailed microscopic examination. Carbonated lime samples collected at the end of each cycle were divided in two, half of which was calcined in an oven at 900° C. Brunauer-Emmet-Teller (BET) surface area measurements were made for carbonated and calcined samples in addition to a scanning electron microscope (SEM) study. The results were compared with a sample of the parent limestone (initial bed material), which was also similarly examined. A summary of the samples and their calcination/carbonation history are given in Table 3.

TABLE 3

Morphological Study-Summary of Sample Properties (Havelock is the parent limestone)

| $CO_2$ Concentration in Air | Cycle | Description |
|---|---|---|
| NA | 0 | Initial bed material |
| 15% | 11 | Carbonated sample collected at the end of a cycle |
| 100% | 12 | |
| 15%° | 14 | |
| 15%11 | | Calcined in oven at 900° C. |
| 100% | 12 | |
| 15% | 14 | |

A Hitachi™ Model 570 SEM was used to examine these samples. Two types of observation were made—surface observations, where particles are glued to a surface, and cross-section observations, where particles are embedded in resin, the sample cut and the surface polished. Photographs were obtained at magnifications of ×40, ×200, ×1000 and ×5000 for both sets of observations. BET surface area measurement of the particles was made using a Micrometrics™ ASAP 2000, which also provides information on the pore volume and average pore size.

The results of the experiments would suggest that carbonating calcium oxide in a pure carbon dioxide environment does not appear to be able to reactivate the sorbent based on the TGA results. Tests performed on Havelock limestone in the TGA showed no appreciable increase in carbon dioxide capacity. FBC data, however, showed a marked rise in overall carbon dioxide capacity when either Havelock or Cadomin limestone was carbonated with pure carbon dioxide. It was further noted that when carbonation was carried out with 100% carbon dioxide for two successive cycles, Havelock limestone maintained a higher carbon dioxide carrying capacity when next carbonated with 15% carbon dioxide in air. Carbonating in a pure carbon dioxide environment for a single cycle, however, did not increase the carbon dioxide carrying capacity when next carbonated with 15% carbon dioxide in air. Instead, sample capacities continued to decay as before.

Given the exothermic nature of the carbonation reaction and the total mass of the lime in the FBC, it is believed that carbonating in pure carbon dioxide exposes particles to much higher local temperatures than would be the case in the TGA, possible sintering particles and altering their pore structure in a manner which increased their carbon dioxide capacity. The FBC bed temperature was observed to experience rises from 700° C. to approximately 900° C. when carbonated with pure carbon dioxide, which would help support the hypothesis that the higher transient temperatures experienced by particles in the FBC appear to affect subsequent behavior.

Figure 7:
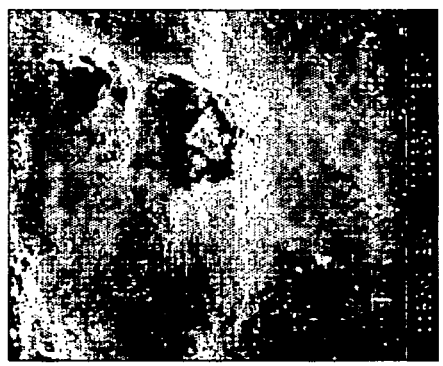
FIG. 7 is a comparison of surface photographs for calcined samples, which were originally carbonated at 15%, 100% and 15%, cycles 11, 12 and 14.
Figure 7:
Figure 7:
Figure 7:
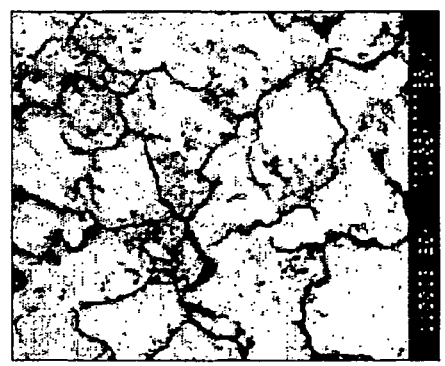
Figure 7:
Figure 7:

However, SEM photographs did not show significant differences between samples carbonated with pure carbon dioxide or with 15% carbon dioxide and air. A comparison of surface photographs for calcined samples, which were originally carbonated at 15%, 100% and 15%, cycles 11, 12 and 14, respectively are presented in FIG. 7, the same is true for images of the particle cross-sections. FIG. 7 shows SEM Images—Surface Images of Calcinated Samples, where a) is cycle 11, b) is cycle 12, c) is cycle 14; and Cross-section Images of Carbonated Samples, where d) is cycle 11, e) is cycle 12, f) is cycle 14. (Cycle 11 and 14 were initially carbonated with 15% $CO_2$ in air. Cycle 12 was initially carbonated with 100% $CO_2$.) There is an apparent increase in pore size with increasing cycle number, but nothing that would distinguish the 100% carbonation sample from the 15% carbonation samples.

BET surface area measurements, pore volume and average pore sizes, presented in Table 4, indicate that carbonating with pure carbon dioxide does influence the particle structure. The BET surface area, pore volume and average pore size for the two 15% samples, before and after carbonating in pure carbon dioxide, are approximately the same, in spite of the fact they are separated by three cycles. The 100% carbonation sample consistently shows lower values for all these measured quantities, lending support to the hypothesis that higher temperature in the FBC may have altered the structure of the limestone particle.

TABLE 4

Surface Area for Havelock Limestone

| Cycle | Pore Volume, $cm^3/g$ | Avg. Pore Size, A | BET, $m^2/g$ | Description |
|---|---|---|---|---|
| 11 | 0.0045 | 200.8 | 1.24 ± 0.009 | Carbonated sample |
| 12 | 0.0015 | 116.9 | 0.60 ± 0.001 | collected at the |
| 14 | 0.0052 | 219.3 | 1.17 ± 0.009 | end of a cycle. |
| 11 | 0.0121 | 319.7 | 2.89 ± 0.044 | Calcined in oven |
| 12 | 0.00306 | 387.6 | 1.07 ± 0.106 | at 900° C. |
| 14 | 0.0918 | 286.9 | 2.48 ± 0.063 | |

The carbonation of calcium oxide in pure carbon dioxide showed differences between TGA and BBC results. TGA performance was unaffected by carbonating in pure carbon dioxide, irrespective of the limestone, whereas the FBC tests clearly showed an increase in carbon dioxide capacity for both Havelock and Cadomin limestones. These results suggest that comparing TGA and FBC experiments may not necessarily be simple, and indicate that caution is necessary when using TGA results in lieu of FBC data. The data presented here suggest that carbonating in pure carbon dioxide is able to reactivate calcium oxide for carbon dioxide capture.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method of treating and reactivating a sorbent for use in capturing carbon dioxide in a fuel combustion process, wherein the combustion process is performed in a fluidized bed and generates carbon dioxide, and the sorbent comprises a calcinable alkaline earth metal, the method comprising
    (a) calcining the sorbent to form an alkaline earth metal oxide; and thereafter
    (b) introducing the alkaline earth metal oxide into a carbonator at a high temperature sufficient to react the alkaline earth metal oxide with a concentrated stream of carbon dioxide capable of shocking the sorbent to produce a carbonate of the alkaline earth metal;
    (c) transferring the alkaline earth metal carbonate into the fluidized bed;
    (d) calcining the alkaline earth metal carbonate to regenerate the alkaline earth metal oxide and carbon dioxide;
    (e) selectively removing the carbon dioxide produced in step (d); and
    (f) returning the alkaline earth metal oxide product of step (d) to the carbonator to capture carbon dioxide generated in the fuel combustion process; and thereafter
    (g) repeating steps (c) to (f) and selectively repeating step (b) between steps (f) and (c).

2. The method as defined in claim 1, wherein the carbon dioxide produced in step (d) is pure carbon dioxide.

3. The method as defined in claim 1, wherein step (b) further produces a residue comprising at least one of spent sorbent material and surplus carbon dioxide, and step (b) further comprises recovering the residue.

4. The method as defined in claim 1, wherein the alkaline earth metal carbonate is limestone.

5. The method as defined in claim 1, wherein the alkaline earth metal oxide is lime.

6. The method as defined in claim 1, wherein the fluidized bed comprises a pressurized fluidized bed combustor (PFBC/C).

7. The method as defined in claim 1, wherein the fluidized bed comprises a circulating fluidized bed combustor (CFBC/C).

8. A method of treating and reactivating a sorbent for use in capturing carbon dioxide in a fuel combustion process, wherein the combustion process is performed in a fluidized bed and generates carbon dioxide, and the sorbent comprises a calcinable alkaline earth metal, the method comprising
    (a) calcining the sorbent in a first calciner to form an alkaline earth metal oxide;
    (b) treating the alkaline earth metal oxide in a hydration reactor to form an alkaline earth metal hydroxide;
    (c) carbonating the alkaline earth metal hydroxide at a high temperature sufficient to react the alkaline earth metal hydroxide with a concentrated stream of carbon dioxide capable of shocking the sorbent to produce a carbonate of the alkaline earth metal and water;
    (d) transferring the alkaline earth metal carbonate into a second calciner and calcining the alkaline earth metal carbonate to regenerate the alkaline earth metal oxide and produce carbon dioxide;

(e) introducing the alkaline earth metal oxide into a carbonator at a temperature of at least 600° C. and subjecting the alkaline earth metal oxide to carbon dioxide of a concentration of at least 85% to produce a carbonate of the alkaline earth metal;

(f) selectively removing the carbon dioxide produced in step (d);

(g) returning the alkaline earth metal oxide product of step (d) to the carbonator to capture carbon dioxide generated in the fuel combustion process; and thereafter (h) repeating steps (b), (c), (d), (f) and (g), and selectively repeating step (e) between steps (f) and (g).

9. The method as defined in claim 8, wherein step (e) further produces a residue comprising at least one of spent sorbent material and surplus carbon dioxide, and step (e) further comprises recovering the residue.

10. The method as defined in claim 8, wherein the carbon dioxide produced in step (d) is pure carbon dioxide.

11. The method as defined in claim 8, wherein step (b) is performed using liquid water or steam at a temperature greater than 50° C.

12. The method as defined in claim 8, wherein step (c) and step (e) are each performed at a temperature in the range of 700° C. to 1200° C.

13. The method as defined in claim 11, wherein step (b) is performed at atmospheric pressure.

14. The method as defined in claim 11, wherein step (b) is performed at a pressure greater than atmospheric pressure.

15. The method as defined in claim 8 wherein the alkaline earth metal carbonate is limestone.

16. The method as defined in claim 8, wherein the alkaline earth metal oxide is lime.

17. The method as defined in claim 8, wherein the fluidized bed comprises a pressurized fluidized bed combustor (PFBC/C).

18. The method as defined in claim 8, wherein the fluidized bed comprises a circulating fluidized bed combustor (CFBC/C).

* * * * *